(12) United States Patent
Lu et al.

(10) Patent No.: US 11,679,661 B2
(45) Date of Patent: Jun. 20, 2023

(54) POWER SPLIT HYBRID POWER SYSTEM AND HYBRID VEHICLE

(71) Applicant: Schaeffler Technologies AG & Co. KG, Herzogenaurach (DE)

(72) Inventors: Zhenye Lu, Shanghai (CN); Mingxi Guan, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 66 days.

(21) Appl. No.: 17/439,488

(22) PCT Filed: Mar. 15, 2019

(86) PCT No.: PCT/CN2019/078339
§ 371 (c)(1),
(2) Date: Sep. 15, 2021

(87) PCT Pub. No.: WO2020/186399
PCT Pub. Date: Sep. 24, 2020

(65) Prior Publication Data
US 2022/0153116 A1 May 19, 2022

(51) Int. Cl.
*B60K 6/365* (2007.10)
*B60K 6/40* (2007.10)
(Continued)

(52) U.S. Cl.
CPC ............ *B60K 6/365* (2013.01); *B60K 6/40* (2013.01); *B60K 6/44* (2013.01); *B60K 6/547* (2013.01);
(Continued)

(58) Field of Classification Search
CPC . B60K 6/365; B60K 6/40; B60K 6/44; B60K 6/547; F16H 3/66; F16H 378/0806;
(Continued)

(56) References Cited

U.S. PATENT DOCUMENTS

| | | | |
|---|---|---|---|
| 2007/0072725 A1* | 3/2007 | Bucknor | B60K 6/365 475/5 |
| 2007/0243966 A1 | 10/2007 | Holmes et al. | |
| 2012/0196721 A1* | 8/2012 | He | B60K 6/52 475/5 |

FOREIGN PATENT DOCUMENTS

| | | |
|---|---|---|
| CN | 104727371 | 6/2015 |
| CN | 104960407 | 10/2015 |

(Continued)

*Primary Examiner* — Roger L Pang
(74) *Attorney, Agent, or Firm* — Volpe Koenig, P.C.

(57) ABSTRACT

The present invention provides a power split hybrid power system and a hybrid vehicle. The hybrid power system comprises two planetary gear mechanisms sharing planetary carriers and ring gears, two motors and one engine. An output shaft of the engine is in transmission connection with a first sun gear shaft of a first sun gear, an input/output shaft of a first motor is in transmission connection with a second sun gear shaft of a second sun gear, and an input/output shaft of a second motor is in transmission connection with the ring gears. The output shaft of the engine, the input/output shaft of the first motor and the input/output shaft of the second motor can be relatively fixed to a housing of a transmission through a braking mechanism. Therefore, the power split hybrid power system can guarantee that a vehicle reaches a high speed in a pure motor driving mode so as to complete New European Driving Cycle and World Light Vehicle Test Cycle; and the engine can also be shut down at a high vehicle speed, and the dynamic property is improved in a low-speed state.

20 Claims, 1 Drawing Sheet

(51) Int. Cl.
   *B60K 6/44*    (2007.10)
   *B60K 6/547*   (2007.10)
   *F16H 3/66*    (2006.01)
   *F16H 37/08*   (2006.01)
   *F16H 57/10*   (2006.01)

(52) U.S. Cl.
   CPC ........... *F16H 3/66* (2013.01); *F16H 37/0806* (2013.01); *F16H 57/10* (2013.01); *B60Y 2200/92* (2013.01); *F16H 2200/2007* (2013.01); *F16H 2200/2038* (2013.01); *F16H 2200/2094* (2013.01)

(58) Field of Classification Search
   CPC ............. F16H 57/10; F16H 2200/2007; F16H 2200/2038; F16H 2200/2094
   USPC ... 475/5, 282, 288, 290, 303, 339, 340, 341, 475/342
   See application file for complete search history.

(56) References Cited

FOREIGN PATENT DOCUMENTS

| | | | | |
|---|---|---|---|---|
| CN | 105644344 A | * | 6/2016 | |
| CN | 105882381 | | 8/2016 | |
| CN | 106585361 | | 4/2017 | |
| CN | 107215199 A | * | 9/2017 | ............. B60K 6/365 |
| CN | 207088979 | | 3/2018 | |
| CN | 107901748 | | 4/2018 | |
| JP | 2006298080 | | 11/2006 | |

* cited by examiner

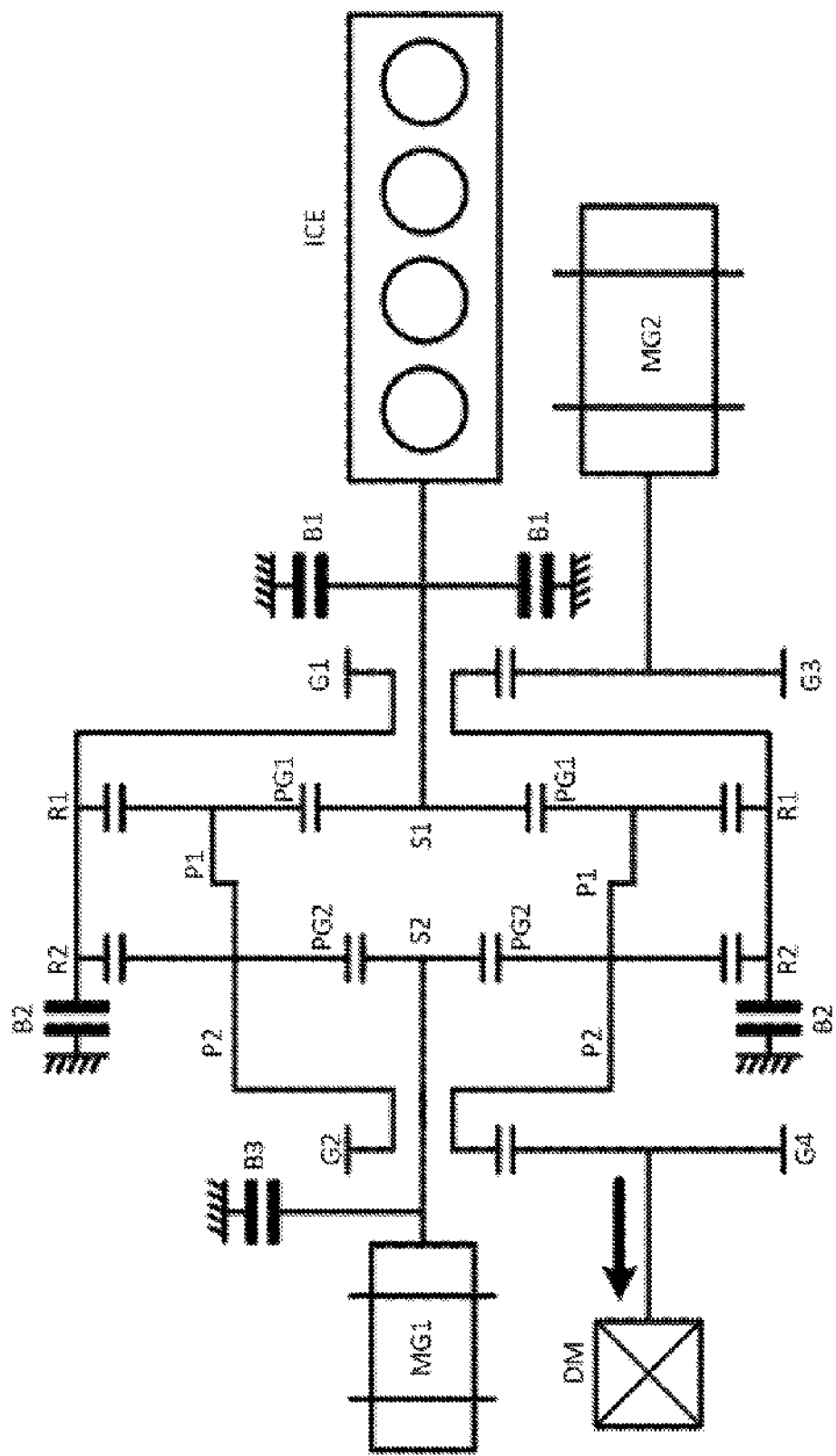

POWER SPLIT HYBRID POWER SYSTEM AND HYBRID VEHICLE

CROSS-REFERENCE TO RELATED APPLICATIONS

This application is the U.S. National Phase of PCT Appln. No. PCT/CN2019/078339, filed Mar. 15, 2019, the entire disclosure of which is incorporated by reference herein.

TECHNICAL FIELD

The present disclosure relates to the field of vehicles, more specifically to a power split hybrid power system and a hybrid vehicle.

BACKGROUND

In the prior art, there are various hybrid power systems used in vehicles and having a power split function, and such hybrid power systems can decouple the speed and torque of the vehicles from the speed and torque of engines. The typical example of this type of hybrid power system is a single-mode input type power split hybrid power system of the first-generation of Toyota Prius which uses one planetary gear mechanism, one engine and two motors. Although the hybrid power system can realize the power split function, it still has the following defects:

1. due to structure limits, the vehicle speed is very low (below 50 km/h) in a pure motor driving mode, so New European Driving Cycle (NEDC)/World Light Vehicle Test Cycle (WLTC) cannot be completed in the pure motor driving mode;

2. the engine must be started when the vehicle speed exceeds a certain value (e.g., 50 km/h), so the engine will consume part of kinetic energy during brake energy recovery in the case of a high vehicle speed, that is, the engine will still work at a rotating speed such as 1000 rpm to 2000 rpm during vehicle braking in the case that the vehicle speed exceeds a certain value, drag torque of the engine itself will consume part of kinetic energy, and therefore this part of kinetic energy cannot be recovered; and 3. in a power split mode, the hybrid power system shows a poor dynamic performance (torque output).

SUMMARY

The present disclosure is proposed to overcome the above defects of the prior art. The object of the present disclosure is to overcome or at least mitigate the above defects in the prior art and to provide a novel power split hybrid power system and a hybrid vehicle comprising the hybrid power system.

To achieve the above object, the following technical solutions are adopted.

The present disclosure provides a power split hybrid power system comprising: a transmission, comprising a first planetary gear mechanism and a second planetary gear mechanism, wherein the first planetary gear mechanism comprises a first sun gear, a plurality of first planetary gears, a first planetary carrier and a first ring gear, the second planetary gear mechanism comprises a second sun gear, a plurality of second planetary gears, a second planetary carrier and a second ring gear, the first planetary carrier and the second planetary carrier are fixed to each other, and the first ring gear and the second ring gear are fixed to each other; an engine, an output shaft of which is in transmission connection with a first sun gear shaft of the first sun gear; a first motor, an input/output shaft of which is in transmission connection with a second sun gear shaft of the second sun gear; a second motor, an input/output shaft of which is in transmission connection with the first ring gear; and a braking mechanism, via which the output shaft of the engine, the input/output shaft of the first motor and the input/output shaft of the second motor can selectively be relatively fixed to a housing of the transmission.

Preferably, the braking mechanism comprises a first brake, a second brake and a third brake, wherein the output shaft of the engine can be relatively fixed to the housing of the transmission via the first brake, the input/output shaft of the second motor can be relatively fixed to the housing of the transmission via the second brake, and the input/output shaft of the first motor can be relatively fixed to the housing of the transmission via the third brake.

More preferably, the first brake, the second brake and the third brake are synchronizers or clutches.

Preferably, the output shaft of the engine is coaxially and directly connected with the first sun gear shaft, the input/output shaft of the first motor is coaxially and directly connected with the second sun gear shaft, and the input/output shaft of the second motor is in transmission connection with the first ring gear through a gear transmission mechanism.

More preferably, the power split hybrid power system further comprises a differential mechanism, wherein the differential mechanism is in transmission connection with the second planetary carrier.

More preferably, the power split hybrid power system further comprises a control module, and can be controlled by the control module to implement a pure motor driving mode, wherein the output shaft of the engine is relatively fixed to the housing of the transmission via the braking mechanism, the first motor and the second motor are in a running state, and the first motor and the second motor collectively transmit torque to the transmission for driving.

More preferably, when the power split hybrid power system is in the pure motor driving mode, torque $T_{out}$ and a rotating speed $N_{out}$ of the second planetary carrier of the power split hybrid power system are calculated through following expressions:

$$T_{out} = \frac{i_2 - i_1}{i_1} T_{MG1} + \frac{1 + i_1}{i_1} T_{MG2},$$

$$N_{out} = \frac{i_1}{i_1 + 1} N_{MG2},$$

where $i_1$ is a transmission ratio of the first sun gear to the first ring gear when the first planetary carrier is stationary, $i_2$ is a transmission ratio of the second sun gear to the second ring gear when the second planetary carrier is stationary, $T_{MG1}$ is torque of the second sun gear, $T_{MG2}$ is torque of the first ring gear, and $N_{MG2}$ is a rotating speed of the first ring gear.

More preferably, the power split hybrid power system further comprises a control module, and can be controlled by the control module to implement a first parallel driving mode, wherein the input/output shaft of the second motor is relatively fixed to the housing of the transmission via the braking mechanism, the engine and the first motor are in a running state, and the engine and the first motor collectively transmit torque to the transmission for driving.

More preferably, when the power split hybrid power system is in the first parallel driving mode, torque $T_{out}$ and a rotating speed $N_{out}$ of the second planetary carrier of the power split hybrid power system are calculated through following expressions:

$$T_{out} = (i_1 + 1)T_{ICE} + (i_2 + 1)T_{MG1},$$

$$N_{out} = \frac{1}{i_1 + 1}N_{ICE} = \frac{1}{i_2 + 1}N_{MG1},$$

where $i_1$ is a transmission ratio of the first sun gear to the first ring gear when the first planetary carrier is stationary, $i_2$ is a transmission ratio of the second sun gear to the second ring gear when the second planetary carrier is stationary, $T_{ICE}$ is torque of the first sun gear, $T_{MG1}$ is torque of the second sun gear, $N_{ICE}$ is a rotating speed of the first sun gear, and $N_{MG1}$ is a rotating speed of the second sun gear.

More preferably, the power split hybrid power system further comprises a control module, and can be controlled by the control module to implement a second parallel driving mode, wherein the input/output shaft of the first motor is relatively fixed to the housing of the transmission via the braking mechanism, the engine and the second motor are in a running state, and the engine and the second motor collectively transmit torque to the transmission for driving.

More preferably, when the power split hybrid power system is in the second parallel driving mode, torque $T_{out}$ and a rotating speed $N_{out}$ of the second planetary carrier of the power split hybrid power system are calculated through following expressions:

$$T_{out} = \frac{i_2 - i_1}{i_2}T_{ICE} + \frac{i_2 + 1}{i_2}T_{MG2},$$

$$N_{out} = \frac{i_2}{i_2 - i_1}N_{ICE} = \frac{i_2}{i_2 + 1}N_{MG2},$$

where $i_1$ is a transmission ratio of the first sun gear to the first ring gear when the first planetary carrier is stationary, $i_2$ is a transmission ratio of the second sun gear to the second ring gear when the second planetary carrier is stationary, $T_{ICE}$ is torque of the first sun gear, $T_{MG2}$ is torque of the first ring gear, $N_{ICE}$ is a rotating speed of the first sun gear, and $N_{MG2}$ is a rotating speed of the first ring gear.

More preferably, the power split hybrid power system further comprises a control module, and can be controlled by the control module to implement a power split mode, wherein the engine and the second motor are both in a running state, the engine and the second motor collectively transmit torque to the transmission for driving, the first motor is in a running state or a stopping state, and when the first motor is in the operating state, the first motor receives torque from the transmission for power generation or the first motor transmits torque to the transmission for driving.

More preferably, when the power split hybrid power system is in the power split mode, torque $T_{out}$ and a rotating speed $N_{out}$ of the second planetary carrier of the power split hybrid power system are calculated through following expressions:

$$T_{out} = T_{ICE} + T_{MG1} + T_{MG2},$$

$$N_{MG1} = \frac{i_2}{i_1}N_{ICE} - \frac{i_2 - i_1}{i_1}N_{out},$$

$$N_{MG2} = -\frac{1}{i_1}N_{ICE} + \frac{i_1 + 1}{i_1}N_{out},$$

where $i_1$ is a transmission ratio of the first sun gear to the first ring gear when the first planetary carrier is stationary, $i_2$ is a transmission ratio of the second sun gear to the second ring gear when the second planetary carrier is stationary, $T_{ICE}$ is torque of the first sun gear, $T_{MG1}$ is torque of the second sun gear, $T_{MG2}$ is torque of the first ring gear, $N_{ICE}$ is a rotating speed of the first sun gear, $N_{MG1}$ is a rotating speed of the second sun gear, and $N_{MG2}$ is a rotating speed of the first ring gear.

The present disclosure further provides a hybrid vehicle, comprising the power split hybrid power system in any one of the above technical solutions.

By adopting the above technical solution, the present disclosure provides a novel power split hybrid power system and a hybrid vehicle comprising the hybrid power system, wherein the hybrid power system comprises two planetary gear mechanisms sharing planetary carriers and ring gears, two motors and one engine. An output shaft of the engine is in transmission connection with a first sun gear shaft of a first sun gear, an input/output shaft of a first motor is in transmission connection with a second sun gear shaft of a second sun gear, and an input/output shaft of a second motor is in transmission connection with the ring gears. In addition, the output shaft of the engine, the input/output shaft of the first motor and the input/output shaft of the second motor can be relatively fixed to a housing of a transmission through a braking mechanism.

In this way, the novel power split hybrid power system can guarantee that a vehicle reaches a high speed (e.g., 130 Km/h) in a pure motor driving mode so as to complete New European Driving Cycle (NEDC)/World Light Vehicle Test Cycle (WLTC); and the novel power split hybrid power system can realize that the engine can also be shut down at a high vehicle speed, and the dynamic performance is improved in a low-speed state.

BRIEF DESCRIPTION OF THE DRAWINGS

FIG. 1 is a schematic diagram of a connection structure of a power split hybrid power system in accordance with an implementation of the present disclosure.

DETAILED DESCRIPTION OF EMBODIMENTS

Exemplary implementations of the present disclosure will be described below with reference to the drawings. It should be understood that the specific description is only used to teach those skilled in the art how to implement the present disclosure, and is not intended to be exhaustive of all possible variations of the present disclosure, nor to limit the scope of the present disclosure. In the present disclosure, the "transmission connection" means that driving force/torque can be transmitted between two components and indicates that, unless indicated otherwise, driving force/torque is transmitted between these two components by way of direct connection or via a traditional gear pair and so on.

(Structure of a Power Split Hybrid Power System According to an Implementation of the Present Disclosure)

As illustrated in FIG. 1, a power split hybrid power system according to an implementation of the present disclosure comprises an engine ICE, two motors (i.e., a first motor MG1 and a second motor MG2), three brakes (i.e., a first brake B1, a second brake B2 and a third brake B3), a transmission and a differential mechanism DM.

Specifically, in this implementation, the transmission comprises two planetary gear mechanisms coaxially disposed side by side.

A first planetary gear mechanism comprises a first sun gear S1, a plurality of first planetary gears PG1 and a first ring gear R1 which mesh with each other, and a first planetary carrier P1 configured to retain the plurality of first planetary gears PG1. A first sun gear shaft of the first sun gear S1 extends to the right side in FIG. 1 and is coaxially and directly connected with an output shaft of the engine ICE. The above "coaxially and directly connected" represents that the first sun gear shaft and the output shaft of the engine ICE may be the same shaft or the first sun gear shaft and the output shaft of the engine ICE are coaxially and rigidly connected with each other, and the same expression in the present application has the same meaning.

A second planetary gear mechanism comprises a second sun gear S2, a plurality of second planetary gears PG2 and a second ring gear R2 which mesh with each other, and a second planetary carrier P2 configured to retain the plurality of second planetary gears PG2. A second sun gear shaft of the second sun gear S2 extends to the left side in FIG. 1 and is coaxially and directly connected with an input/output shaft of the first motor MG1. Further, in this implementation, the second ring gear R2 is connected with a housing of the transmission via the second brake B2. The second planetary carrier P2 and the first planetary carrier P1 are fixed to each other, and the second ring gear R2 and the first ring gear R1 are fixed to each other. That is, in this implementation, the second planetary gear mechanism and the first planetary gear mechanism share one planetary carrier and one ring gear. In addition, in order to realize fixation between the second planetary carrier P2 and the first planetary carrier P1 having different radial dimensions, a fixed connection part may be arranged between the second planetary carrier P2 and the first planetary carrier P1 as needed.

Further, the transmission also comprises a ring-gear gear G1 fixed to the first ring gear R1 and a planetary carrier gear G2 fixed to the planetary carrier P2. The ring-gear gear G1 is configured to be in a meshing state with a second motor input/output gear G3 fixed to an input/output shaft of the second motor MG2 all the time, the planetary carrier gear G2 is configured to be in a meshing state with an output gear G4 all the time, and the output gear G4 can transmit torque from the transmission to the differential mechanism DM.

In this implementation, the engine ICE is, for example, a four-cylinder engine and is arranged on one side (right side in FIG. 1) of the transmission. On one hand, the output shaft of the engine ICE is coaxially and directly connected with the first sun gear shaft of the first sun gear S1; and on the other hand, the output shaft of the engine ICE is connected with the housing of the transmission via the first brake B1, such that the output shaft of the engine ICE is fixed relative to the housing of the transmission after the first brake B1 produces a braking action.

In this implementation, relative to the transmission, the first motor MG1 is arranged on a side (left side in FIG. 1) opposite to the side where the engine ICE is located. On one hand, the input/output shaft of the first motor MG1 is coaxially and directly connected with the second sun gear shaft of the second sun gear S2 so as to realize bidirectional transmission of driving force/torque between the first motor MG1 and the second sun gear shaft; and on the other hand, the input/output shaft of the first motor MG1 is connected with the housing of the transmission via the third brake B3, such that the input/output shaft of the first motor MG1 is fixed relative to the housing of the transmission after the third brake B3 produces a braking action.

When electric energy is supplied to the first motor MG1 by a battery (not shown) as an example of an energy storage device, the first motor MG1 can work as an electric motor to transmit driving force/torque to the second sun gear shaft, and when the first motor MG1 obtains the driving force/torque from the second sun gear shaft, the first motor MG1 can work as an electric generator to charge the battery.

In this implementation, relative to the transmission, the second motor MG2 is arranged on a side (right side in FIG. 1) the same as the side where the engine ICE is located. As described above, the input/output shaft of the second motor MG2 is in transmission connection with the first ring gear R1 via the second motor input/output gear G3 and the ring-gear gear G1 so as to realize bidirectional transmission of driving force/torque between the second motor MG2 and the first ring gear R1. In addition, given that the second ring gear R2 is connected with the housing of the transmission via the second brake B2, the second ring gear R2, the first ring gear R1 and the input/output shaft of the second motor MG2 are all fixed relative to the housing of the transmission after the second brake B2 produces a braking action.

When electric energy is supplied to the second motor MG2 by a battery (not shown) as an example of an energy storage device, the second motor MG2 can work as an electric motor to transmit driving force/torque to the first ring gear R1, and when the second motor MG2 obtains the driving force/torque from the first ring gear R1, the second motor MG2 can work as an electric generator to charge the battery.

In this implementation, the output shaft of the engine ICE is connected with the housing of the transmission via the first brake B1, such that the first brake B1 is configured to make the output shaft of the engine ICE fixed relative to the housing of the transmission; the second ring gear R2 is connected with the housing of the transmission via the second brake B2, such that the second brake B2 is configured to make the second ring gear R2, the first ring gear R1 and the input/output shaft of the second motor MG2 fixed relative to the housing of the transmission; and the input/output shaft of the first motor MG1 is connected with the housing of the transmission via the third brake B3, such that the third brake B3 is configured to make the input/output shaft of the first motor MG1 fixed relative to the housing of the transmission. In this way, the hybrid power system can be flexibly controlled to be in different operating modes through the three brakes B1, B2 and B3. These three brakes B1, B2 and B3 may be synchronizers or clutches.

In this implementation, the differential mechanism DM is in transmission connection with wheels as a component of the whole hybrid power system to output the driving force/torque to the wheels, and the differential mechanism DM may be a differential mechanism in the prior art, of which the specific structure is not described in detail here.

The specific structure of the power split hybrid power system according to an implementation of the present disclosure is described in detail above, and the operating modes of the power split hybrid power system will be described below.

(Operating Modes of the Power Split Hybrid Power System According to an Implementation of the Present Disclosure)

The hybrid power system according to an implementation of the present disclosure shown in FIG. 1 further comprises a control module (not shown), and can be controlled by the control module to be in the following four operating modes, respectively a pure motor driving mode, a first parallel driving mode (parallel deceleration driving mode), a second parallel driving mode (parallel over-speed driving mode) and a power split mode.

Table 1 below shows operating states of the three brakes B1, B2 and B3 and speed ranges and performance of a vehicle in the four operating modes.

| Operating Mode | Brake B1 | Brake B2 | Brake B3 | Speed Range | Performance |
|---|---|---|---|---|---|
| Pure Motor Driving Mode | Working | Not working | Not working | Low speed/ intermediate speed | Intermediate |
| First Parallel Driving Mode | Not working | Working | Not working | Low speed | Very high |
| Second Parallel Driving Mode | Not working | Not working | Working | Intermediate speed | High |
| Power Split Mode | Not working | Not working | Not working | Low speed/ intermediate speed/high speed | Intermediate |

The following explanation is provided for the contents in Table 1 above:

1. "Working" means that the brakes play a role of braking to make corresponding components relatively fixed to each other, for example, the output shaft of the engine ICE is fixed relative to the housing of the transmission when the first brake B1 works; and "not working" means that the braking actions of the brakes are released, for example, the output shaft of the engine ICE can rotate relative to the housing of the transmission when the first brake B1 does not work.

2. "Speed range" refers to a vehicle speed range to which each operating mode is applicable; and "performance" is comprehensive evaluation of dynamic performance and the like of a vehicle in the operating mode, specifically see after-mentioned description.

In conjunction with Table 1 above, the operating modes of the hybrid power system in FIG. 1 are described in more details.

When the power split hybrid power system is in the pure motor driving mode, the first brake B1 works while the second brake B2 and the third brake B3 do not work, the output shaft of the engine ICE is relatively fixed to the housing of the transmission via the first brake B1, the first motor MG1 and the second motor MG2 are in a running state, and the first motor MG1 and the second motor MG2 collectively transmit torque to the transmission for driving. In this way, in such operating mode, torque $T_{out}$ and a rotating speed $N_{out}$ of the second planetary carrier P2 of the power split hybrid power system can be calculated through following expressions:

$$T_{out} = -\frac{i_2 - i_1}{i_1} T_{MG1} + \frac{1 + i_1}{i_1} T_{MG2},$$

$$N_{out} = \frac{i_1}{i_1 + 1} N_{MG2},$$

where $i_1$ is a transmission ratio (angular speed ratio) of the first sun gear S1 to the first ring gear R1 when the first planetary carrier P1 is stationary, $i_2$ is a transmission ratio of the second sun gear S2 to the second ring gear R2 when the second planetary carrier P2 is stationary, $T_{MG1}$ is torque of the second sun gear S2, $T_{MG2}$ is torque of the first ring gear R1, and $N_{MG2}$ is a rotating speed of the first ring gear R1.

In this way, when, for example, $i_1=2$ and $i_2=3.2$, $$T_{out}=-3/5T_{MG1}+3/2T_{MG2},$$

$$N_{out}=2/3N_{MG2}.$$

When the power split hybrid power system is in the first parallel driving mode, the second brake B2 works while the first brake B1 and the third brake B3 do not work, the second ring gear R2, the first ring gear R1 and the input/output shaft of the second motor MG2 are relatively fixed to the housing of the transmission via the second brake B2, the engine ICE and the first motor MG1 are in a running state, and the engine ICE and the first motor MG1 collectively transmit torque to the transmission for driving. In this way, in the operating mode, torque $T_{out}$ and a rotating speed $N_{out}$ of the second planetary carrier P2 of the power split hybrid power system can be calculated through following expressions:

$$T_{out} = (i_1 + 1)T_{ICE} + (i_2 + 1)T_{MG1},$$

$$N_{out} = \frac{1}{i_1 + 1} N_{ICE} = \frac{1}{i_2 + 1} N_{MG1},$$

where $i_1$ is a transmission ratio of the first sun gear S1 to the first ring gear R1 when the first planetary carrier P1 is stationary, $i_2$ is a transmission ratio of the second sun gear S2 to the second ring gear R2 when the second planetary carrier P2 is stationary, $T_{ICE}$ is torque of the first sun gear S1, $T_{MG1}$ is torque of the second sun gear S2, $N_{ICE}$ is a rotating speed of the first sun gear S1, and $N_{MG1}$ is a rotating speed of the second sun gear S2.

In this way, when, for example, $i_1=2$ and $i_2=3.2$, $$T_{out}=3T_{ICE}+4.2T_{MG1},$$

$$N_{out}=1/3N_{ICE}=5/21N_{MG1}.$$

It can thus be known that in the first parallel driving mode, the power split hybrid power system can obtain extremely large torque within a low speed range for driving When the power split hybrid power system is in the second parallel driving mode, the third brake B3 works while the first brake B1 and the second brake B2 do not work, the input/output shaft of the first motor MG1 is relatively fixed to the housing of the transmission via the third brake B3, the engine ICE and the second motor MG2 are in a running state, and the engine ICE and the second motor MG2 collectively transmit torque to the transmission for driving. In this way, in the operating mode, torque $T_{out}$ and a rotating speed $N_{out}$ of the second planetary carrier P2 of the power split hybrid power system can be calculated through following expressions:

$$T_{out} = \frac{i_2 - i_1}{i_2} T_{ICE} + \frac{i_2 + 1}{i_2} T_{MG2},$$

-continued $$N_{out} = \frac{i_2}{i_2 - i_1}N_{ICE} = \frac{i_2}{i_2 + 1}N_{MG2},$$

where $i_1$ is a transmission ratio of the first sun gear S1 to the first ring gear R1 when the first planetary carrier P1 is stationary, $i_2$ is a transmission ratio of the second sun gear S2 to the second ring gear R2 when the second planetary carrier P2 is stationary, $T_{ICE}$ is torque of the first sun gear S1, $T_{MG2}$ is torque of the first ring gear R1, $N_{ICE}$ is a rotating speed of the first sun gear S1, and $N_{MG2}$ is a rotating speed of the first ring gear R1.

In this way, when, for example, $i_1=2$ and $i_2=3.2$, $$T_{out}=-3/8T_{ICE}+21/16T_{MG2},$$

$$N_{out}=8/3N_{ICE}16/21N_{MG2}.$$

It can thus be known that in the second parallel driving mode, the power split hybrid power system according to the present disclosure can obtain high driving efficiency and fuel economy within a high speed range When the power split hybrid power system is in the power split mode, none of the three brakes B1, B2 and B3 works, the engine ICE and the second motor MG2 are both in a running state, the engine ICE and the second motor MG2 collectively transmit torque to the transmission for driving, the first motor MG1 is in a running state or a stopping state, and when the first motor MG1 is in the running state, the first motor MG1 receives torque from the transmission for power generation or the first motor MG1 transmits torque to the transmission for driving. In this way, in the operating mode, torque $T_{out}$ and a rotating speed $N_{out}$ of the second planetary carrier P2 of the power split hybrid power system can be calculated through following expressions:

$$T_{out} = T_{ICE} + T_{MG1} + T_{MG2},$$

$$N_{MG1} = \frac{i_2}{i_1}N_{ICE} - \frac{i_2 - i_1}{i_1}N_{out},$$

$$N_{MG2} = -\frac{1}{i_1}N_{ICE} + \frac{i_1 + 1}{i_1}N_{out},$$

where $i_1$ is a transmission ratio of the first sun gear S1 to the first ring gear R1 when the first planetary carrier P1 is stationary, $i_2$ is a transmission ratio of the second sun gear S2 to the second ring gear R2 when the second planetary carrier P2 is stationary, $_{ICE}$ is torque of the first sun gear S1, $T_{MG1}$ is torque of the second sun gear S2, $T_{MG2}$ is torque of the first ring gear R1, $N_{ICE}$ is a rotating speed of the first sun gear S1, $N_{MG1}$ is a rotating speed of the second sun gear S2, and $N_{MG2}$ is a rotating speed of the first ring gear R1.

In this way, when, for example, $i_1=2$ and $i_2=3.2$, $$N_{MG1}=-1.6N_{ICE}-0.6N_{out},$$

$$N_{MG2}=-0.5N_{ICE}+1.5N_{out}.$$

It can thus be known that when the power split hybrid power system according to the present disclosure is in the power split mode, the engine can work at any operating point and be in a continuously variable transmission state, thereby greatly improving fuel economy In addition, an operating pattern of the power split hybrid power system according to the present disclosure can be set as follows based on the four operating modes above:

when the working pattern of pure motor driving is selected, the power split hybrid power system according to the present disclosure can be always maintained in the state of the pure motor driving mode till the battery capacity is zero;

when a hybrid Auto operating pattern is selected, the power split hybrid power system according to the present disclosure is started from the pure motor driving mode, and after the vehicle speed is increased, the system enters the power split mode or the second parallel driving mode at an appropriate time by calculating system efficiency; and when a hybrid Sport mode is selected, the power split hybrid power system according to the present disclosure will directly start the engine from the power split mode and immediately enter the first parallel driving mode after starting to obtain optimum dynamic performance, and then is switched to the power split mode after the vehicle speed is increased Further, the present disclosure also provides a hybrid vehicle comprising the power split hybrid power system having the above structure and operating modes Specific embodiments of the present disclosure are set forth in detail above, but it should also be noted that:

I. The power split hybrid power system according to the present disclosure may implement the four operating modes via the three brakes above, so that the hybrid power system may implement efficient driving under various working conditions.

II. The engine is controlled by the brakes to act, which enables the engine to select to be in parallel to the hybrid power system in a low speed state or a high speed state, such that the dynamic performance is high in the low speed state or the system efficiency is high in the high speed state.

III. With the power split hybrid power system according to the present disclosure, the application range in the pure motor driving mode is expanded, and not only is overall system efficiency improved, but also the power split hybrid power system can be applied to plug-in hybrid vehicles.

IV. The power split hybrid power system according to the present disclosure can be applied to hybrid power systems in different layouts disposed along a longitudinal direction and a transverse direction of a vehicle.

V. In the formulas involved in the present application, $T_{MG1}$ refers to the torque of the second sun gear S2 connected with the first motor MG1 instead of the torque of the first motor MG1, and $N_{MG1}$ refers to the rotating speed of the second sun gear S2 connected with the first motor MG1 instead of the rotating speed of the first motor MG1, this is because the torque and the rotating speed of the first motor MG1 differ from the torque and the rotating speed of the second sun gear S2, and this difference results from structures, such as a coaxial connector, that produce a transmission ratio, which may exist in a connecting structure of the input/output shaft of the first motor MG1 and the second sun gear shaft of the second sun gear S2. Likewise, similar situations occur in other parameters.

DESCRIPTION OF REFERENCE NUMERALS

ICE engine; MG1 first motor; MG2 second motor; S1 first sun gear; P1 first planetary carrier; PG1 first planetary gear; R1 first ring gear; S2 second sun gear; P2 second planetary carrier; PG2 second planetary gear; R2 second ring gear; B1 first brake; B2 second brake; B3 third brake; G1 ring-gear gear; G2 planetary carrier gear; G3 second motor input/output gear; G4 output gear; and DM differential mechanism.

The invention claimed is:

1. A power split hybrid power system, comprising:
a transmission, comprising a first planetary gear mechanism and a second planetary gear mechanism, wherein the first planetary gear mechanism comprises a first sun gear, a plurality of first planetary gears, a first planetary carrier, and a first ring gear meshing with the plurality of first planetary gears, the second planetary gear mechanism comprises a second sun gear, a plurality of second planetary gears, a second planetary carrier, and a second ring gear meshing with the plurality of second planetary gears, the first planetary carrier and the second planetary carrier are fixed to each other, and the first ring gear and the second ring gear are fixed to each other;
an engine including an output shaft that is in driving connection with a first sun gear shaft of the first sun gear;
a first motor including an input/output shaft that is in driving connection with a second sun gear shaft of the second sun gear;
a second motor including an input/output shaft that is in driving connection with the first ring gear; and
at least one braking mechanism, via which the output shaft of the engine, the input/output shaft of the first motor, and the input/output shaft of the second motor are selectively fixable relative to a housing of the transmission.

2. The power split hybrid power system according to claim 1, wherein the at least one braking mechanism comprises a first brake, a second brake, and a third brake,
the output shaft of the engine is fixable relative to the housing of the transmission via the first brake,
the input/output shaft of the second motor is fixable relative to the housing of the transmission via the second brake, and
the input/output shaft of the first motor is fixable relative to the housing of the transmission via the third brake.

3. The power split hybrid power system according to claim 2, wherein the first brake, the second brake, and the third brake comprise synchronizers or friction brakes.

4. The power split hybrid power system according to claim 1, wherein the output shaft of the engine is coaxially and directly connected with the first sun gear shaft, the input/output shaft of the first motor is coaxially and directly connected with the second sun gear shaft, and the input/output shaft of the second motor is drivingly connected with the first ring gear through a gear transmission mechanism.

5. The power split hybrid power system according to claim 4, wherein the power split hybrid power system further comprises a differential mechanism, and the differential mechanism is drivingly connected with the second planetary carrier.

6. The power split hybrid power system according to claim 5, further comprising a control module, wherein the control module is configured to implement a pure motor driving mode for the power split hybrid power system in which the output shaft of the engine is fixed relative to the housing of the transmission via the at least one braking mechanism, the first motor and the second motor are in a running state, and the first motor and the second motor collectively transmit torque to the transmission for driving.

7. The power split hybrid power system according to claim 6, wherein when the power split hybrid power system is in the pure motor driving mode, a torque $T_{out}$ and a rotating speed $N_{out}$ of the second planetary carrier of the power split hybrid power system are calculated through following expressions:

$$T_{out} = -\frac{i_2 - i_1}{i_1} T_{MG1} + \frac{1 + i_1}{i_1} T_{MG2},$$

$$N_{out} = \frac{i_1}{i_1 + 1} N_{MG2},$$

where $i_1$ is a transmission ratio of the first sun gear to the first ring gear when the first planetary carrier is stationary, $i_2$ is a transmission ratio of the second sun gear to the second ring gear when the second planetary carrier is stationary, $T_{MG1}$ is a torque of the second sun gear, $T_{MG2}$ is a torque of the first ring gear, and $N_{MG2}$ is a rotating speed of the first ring gear.

8. The power split hybrid power system according to claim 5, further comprising a control module, wherein the control module is configured to implement a first parallel driving mode for the power split hybrid power system in which the input/output shaft of the second motor is fixed relative to the housing of the transmission via the at least one braking mechanism, the engine and the first motor are in a running state, and the engine and the first motor collectively transmit torque to the transmission for driving.

9. The power split hybrid power system according to claim 8, wherein when the power split hybrid power system is in the first parallel driving mode, a torque $T_{out}$ and a rotating speed $N_{out}$ of the second planetary carrier of the power split hybrid power system are calculated through following expressions:

$$T_{out} = (i_1 + 1)T_{ICE} + (i_2 + 1)T_{MG1},$$

$$N_{out} = \frac{1}{i_1 + 1} N_{ICE} = \frac{1}{i_2 + 1} N_{MG1},$$

where $i_1$ is a transmission ratio of the first sun gear to the first ring gear when the first planetary carrier is stationary, $i_2$ is a transmission ratio of the second sun gear to the second ring gear when the second planetary carrier is stationary, $T_{ICE}$ is a torque of the first sun gear, $T_{MG1}$ is a torque of the second sun gear, $N_{ICE}$ is a rotating speed of the first sun gear, and $N_{MG1}$ is a rotating speed of the second sun gear.

10. The power split hybrid power system according to claim 5, further comprising a control module, wherein the control module is configured to implement a second parallel driving mode for the power split hybrid power system in which the input/output shaft of the first motor is fixed relative to the housing of the transmission via the at least one braking mechanism, the engine and the second motor are in a running state, and the engine and the second motor collectively transmit torque to the transmission for driving.

11. The power split hybrid power system according to claim 10, wherein when the power split hybrid power system is in the second parallel driving mode, a torque $T_{out}$ and a rotating speed $N_{out}$ of the second planetary carrier of the power split hybrid power system are calculated through following expressions:

$$T_{out} = \frac{i_2 - i_1}{i_2} T_{ICE} + \frac{i_2 + 1}{i_2} T_{MG2},$$

-continued $$N_{out} = \frac{i_2}{i_2 - i_1} N_{ICE} = \frac{i_2}{i_2 + 1} N_{MG2},$$

where $i_1$ is a transmission ratio of the first sun gear to the first ring gear when the first planetary carrier is stationary, $i_2$ is a transmission ratio of the second sun gear to the second ring gear when the second planetary carrier is stationary, $T_{ICE}$ is a torque of the first sun gear, $T_{MG2}$ is a torque of the first ring gear, $N_{ICE}$ is a rotating speed of the first sun gear, and $N_{MG2}$ is a rotating speed of the first ring gear.

12. The power split hybrid power system according to claim 5, further comprising a control module, wherein the control module is configured to implement a power split driving mode for the power split hybrid power system in which the engine and the second motor are both in a running state, the engine and the second motor collectively transmit torque to the transmission for driving, the first motor is in a running state or a stopping state, and when the first motor is in the running state, the first motor receives torque from the transmission for power generation or the first motor transmits torque to the transmission for driving.

13. The power split hybrid power system according to claim 12, wherein when the power split hybrid power system is in the power split mode, a torque $T_{out}$ and a rotating speed $N_{out}$ of the second planetary carrier of the power split hybrid power system are calculated through following expressions:

$$T_{out} = T_{ICE} + T_{MG1} + T_{MG2},$$

$$N_{MG1} = \frac{i_2}{i_1} N_{ICE} - \frac{i_2 - i_1}{i_1} N_{out},$$

$$N_{MG2} = -\frac{1}{i_1} N_{ICE} + \frac{i_1 + 1}{i_1} N_{out},$$

where $i_1$ is a transmission ratio of the first sun gear to the first ring gear when the first planetary carrier is stationary, $i_2$ is a transmission ratio of the second sun gear to the second ring gear when the second planetary carrier is stationary, $T_{ICE}$ is a torque of the first sun gear, $T_{MG1}$ is a torque of the second sun gear, $T_{MG2}$ is a torque of the first ring gear, $N_{ICE}$ is a rotating speed of the first sun gear, $N_{MG1}$ is a rotating speed of the second sun gear, and $N_{MG2}$ is a rotating speed of the first ring gear.

14. A hybrid vehicle, comprising the power split hybrid power system according to claim 1.

15. The power split hybrid power system according to claim 6, wherein the control module is further configured to implement a first parallel driving mode for the power split hybrid power system in which the input/output shaft of the second motor is fixed relative to the housing of the transmission via the at least one braking mechanism, the engine and the first motor are in a running state, and the engine and the first motor collectively transmit torque to the transmission for driving.

16. The power split hybrid power system according to claim 15, wherein the control module is further configured to implement a second parallel driving mode for the power split hybrid power system in which the input/output shaft of the first motor is fixed relative to the housing of the transmission via the at least one braking mechanism, the engine and the second motor are in a running state, and the engine and the second motor collectively transmit torque to the transmission for driving.

17. The power split hybrid power system according to claim 16, wherein the control module is further configured to implement a power split driving mode for the power split hybrid power system in which the engine and the second motor are both in a running state, the engine and the second motor collectively transmit torque to the transmission for driving, the first motor is in a running state or a stopping state, and when the first motor is in the running state, the first motor receives torque from the transmission for power generation or the first motor transmits torque to the transmission for driving.

18. A power split hybrid power system, comprising:
a transmission, comprising a first planetary gear mechanism and a second planetary gear mechanism, wherein the first planetary gear mechanism comprises a first sun gear, a plurality of first planetary gears, a first planetary carrier, and a first ring gear, the second planetary gear mechanism comprises a second sun gear, a plurality of second planetary gears, a second planetary carrier, and a second ring gear, the first planetary carrier and the second planetary carrier are fixed to each other, and the first ring gear and the second ring gear are fixed to each other;
an engine including an output shaft that is coaxially and directly in driving connection with a first sun gear shaft of the first sun gear;
a first motor including an input/output shaft that is coaxially and directly in driving connection with a second sun gear shaft of the second sun gear;
a second motor including an input/output shaft that is in driving connection with the first ring gear through a gear transmission mechanism;
at least one braking mechanism, via which the output shaft of the engine, the input/output shaft of the first motor and the input/output shaft of the second motor are selectively fixable relative to a housing of the transmission; and
a control module configured to selectively activate the at least one braking mechanism to at least one of: fix the output shaft of the engine relative to the housing, fix the input/output shaft of the second motor relative to the housing of the transmission, or fix the input/output shaft of the first motor relative to the housing.

19. The power split hybrid power system according to claim 18, wherein the control module is further configured to implement a pure motor driving mode for the power split hybrid power system in which the output shaft of the engine is fixed relative to the housing of the transmission via the at least one braking mechanism, the first motor and the second motor are in a running state, and the first motor and the second motor collectively transmit torque to the transmission for driving.

20. The power split hybrid power system according to claim 18, wherein the control module is further configured to implement a power split driving mode for the power split hybrid power system in which the engine and the second motor are both in a running state, the engine and the second motor collectively transmit torque to the transmission for driving, the first motor is in a running state or a stopping state, and when the first motor is in the running state, the first motor receives torque from the transmission for power generation or the first motor transmits torque to the transmission for driving.

* * * * *